United States Patent [19]

Day et al.

[11] 4,038,663
[45] July 26, 1977

[54] METHOD OF WRITING INFORMATION WITH A MODULATED RADIATION BEAM ONTO AN INFORMATION STORAGE MEDIUM AND INFORMATION STORAGE MEDIUM PARTICULARLY ADAPTED TO THE METHOD

[75] Inventors: Paul Edwin Day, Eindhoven, Netherlands; George Churchill Kenney, Stamford, Conn.

[73] Assignees: U.S. Philips Corporation; North American Philips Corporation, both of New York, N.Y.

[21] Appl. No.: 615,881

[22] Filed: Sept. 23, 1975

[51] Int. Cl.² ............................................. G01D 15/32
[52] U.S. Cl. .................................... 346/1; 219/121 L; 346/76 L; 346/137; 358/128; 358/297
[58] Field of Search ................ 346/1, 76 L, 135, 137; 178/6.6 B; 219/121 L, 121 LM; 358/297, 128

[56] References Cited

U.S. PATENT DOCUMENTS

| 3,369,101 | 2/1968 | DiCurcio | 219/121 L |
|---|---|---|---|
| 3,626,141 | 12/1971 | Daly | 219/121 L |
| 3,636,251 | 1/1972 | Daly et al. | 178/6.6 B |
| 3,665,483 | 5/1972 | Becker | 346/1 |
| 3,866,398 | 2/1975 | Vernon | 219/121 L X |
| 4,001,840 | 1/1977 | Becker | 346/76 L |

*Primary Examiner*—Joseph W. Hartary
*Attorney, Agent, or Firm*—Frank R. Trifari; Simon L. Cohen

[57] ABSTRACT

A method and apparatus for writing video information with a laser on a recording surface employing a protective foil on the writing surface through which foil the laser write beam is focussed. A stream of filtered gas is passed between the foil and the writing surface to remove any gaseous or particulate by-products of the writing process, and to protect the writing surface from room contaminance.

6 Claims, 5 Drawing Figures

METHOD OF WRITING INFORMATION WITH A MODULATED RADIATION BEAM ONTO AN INFORMATION STORAGE MEDIUM AND INFORMATION STORAGE MEDIUM PARTICULARLY ADAPTED TO THE METHOD

BACKGROUND OF THE INVENTION

1. Field of the Invention

This invention relates generally to the fabrication of master records and direct read after write ("draw") records using an information modulated radiation write beam, and it relates more particularly to video master records and video direct read after write records. The invention also relates to records particularly adapted to the method of fabrication, but also having advantages unrelated to the method of fabrication.

2. Description of the Prior Art

Several methods have been developed in the past for writing information onto an information storage medium using an information modulated radiation write beam. The information storage medium, which may be a video master record or a video "draw" record, has a radiation sensitive layer on at least one of its faces and is exposed to the radiation write beam during writing. In the article "A Review of the MCA Disco-Vision System" (Journal of the SMPTE, July '74, Volume 83) (hereby incorporated by reference) a method, typical to the prior art, for fabricating a master video record is described. The master record comprises a glass disc base on which a thin metal film is evaporated. This film is sensitive to a radiation write beam provided by an argon-ion laser. The write beam is modulated by a Pockels cell and directed by optics onto the metal film of the rotating disc, to produce an information track consisting of small holes in the metal film where the metal film is evaporated by the beam. The last few optical elements in the write beam are mounted on a carriage that is moved along the record's radius by a motor-driven lead screw. The objective lens is supported on an air bearing, which is loaded against the surface of the record. A relatively small air flow at moderately high pressure maintains the head and objective lens at a constant distance of approximately 0.0005 inch (0.013 mm) from the metal film surface.

A master record thus fabricated may also be used as a direct read after write record. Since reproduction from a direct read after write record provides a higher quality television picture than may be provided by video magnetic tapes, it is believed that there may be a potential in the future for the use of direct read after write records for recording purposes as a high quality alternative to magnetic tape recording.

The problems presently encountered in master and "draw" record fabrication are mainly due to dust particles settling on the surface of the information layer imparing the formation and read-out of the information track. Also, with methods wherein the write beams evaporates material out of a metal film, evaporated material may settle on the objective lens, thus intefering with the optical properties of the lens.

The last mentioned problem could be overcome by using a different kind of information layer, such as a photographic or photochemical layer. At the present state of the art however, it is not possible to monitor the recording with these layers as compared to a photomechanical layer such as the already described metal film, due to the act that the virtual image immediately available on recording must be developed before it can be formed into distinct radiation read beam modulating "pits", measuring roughly 1 $\mu$m $\times$ 2 $\mu$m at a mean distance in the track of 1.66 $\mu$m.

The first mentioned problem may be overcome by carrying out the method in an ultra clean room, having special and elaborate equipment to filter most of the dust out of the air.

It is an object of the invention to provide a method that will alleviate the above methioned problems and that may be used outside of an ultra clean room, for instance for the direct recording prior to broadcasting of television programs in or outside a television studio.

It is a further object of the invention to provide a record which is particularly adapted for use with the new method. Another object is to provide an information storage record that has information tracks provided in a surface layer and which may be reproduced without loss of quality of the reproduced information due to dust particles on the information tracks.

SUMMARY OF THE INVENTION

In accordance with this invention, a method for writing information with a modulated information beam onto an information storage medium having a radiation sensitive information layer in which the information may be stored by providing local deformations on and/or in the outer surface of the information layer is provided, which method comprises at least the following steps:

a. providing a write beam transparent protective means over and spaced from the surface of the information layer, b. modulating the write beam with the information to be stored on the storage medium, c. focussing the write beam through the protective means on the information layer and d. moving the write beam relative to the storage medium and the protective means and forming information tracks in and/or on the informative layer.

In the method according to the invention the objective for focussing the write beam is separated from the surface of the information layer by a distance greater than the thickness of the transparent protective means, which may be a foil. Dust particles, present in the ambient air, may settle on the surface of the protective means. However, this surface being out of focus of the objective, the detrimental effect on the quality of the recording will be much less than in the prior art method, where the dust particles may settle on the very surface on which the objective is focussed. Also, if a write method similar to the earlier described prior art method is used, the protective means will protect the objective against the metal evaporated by the write beam.

The optics of the objective used in the method according to the invention will have to be modified, since the optical path of the radiation beam is increased by the thickness of the protective means. The required modification however calls for techniques which are entirely state of the art and identical to the known techniques used in optical microscopes to adapt the microscope objective to the thickness of the cover-glasses used in microscopic slides.

In accordance with the invention there is also provided an information storage medium having a protective means, such as a protective foil, attached to it. This has the advantage that the first step of the method according to the invention may be carried out in the manufacture of the storage medium. The first step may thus be carried out more economically and blank storage media may be kept in stock ready for use without the need of keeping them in a dust tight enclosure or of cleaning the surface of the information layer prior to the information writing steps.

BRIEF DESCRIPTION OF THE DRAWINGS

The features of the invention which are believed to be novel are set forth with particularity in the appended claims. The invention, together with further objects and advantages thereof, may best be understood by reference to the following description taken in conjunction with the accompanying drawings in which like reference numerals identify like elements, and in which:

In the figures like parts are designated with like reference numerals.

DESCRIPTION OF THE PREFERRED EMBODIMENT

Figure 1:
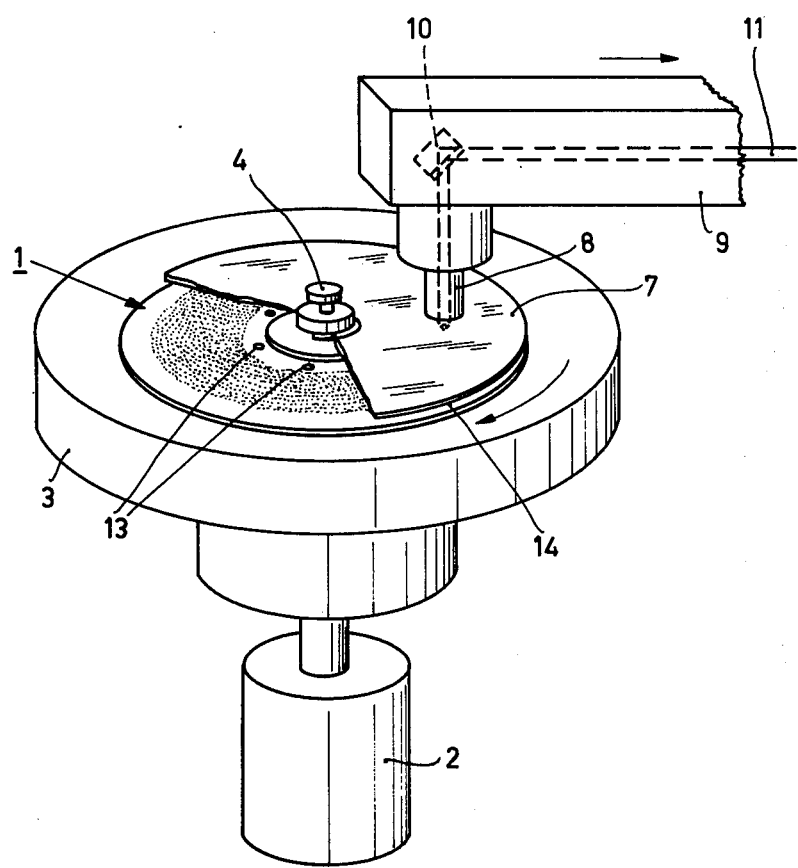
FIG. 1 is a perspective view of a video master recording machine with a video master record in place on a turntable, part of the protective foil of the record broken away.
Figure 2:
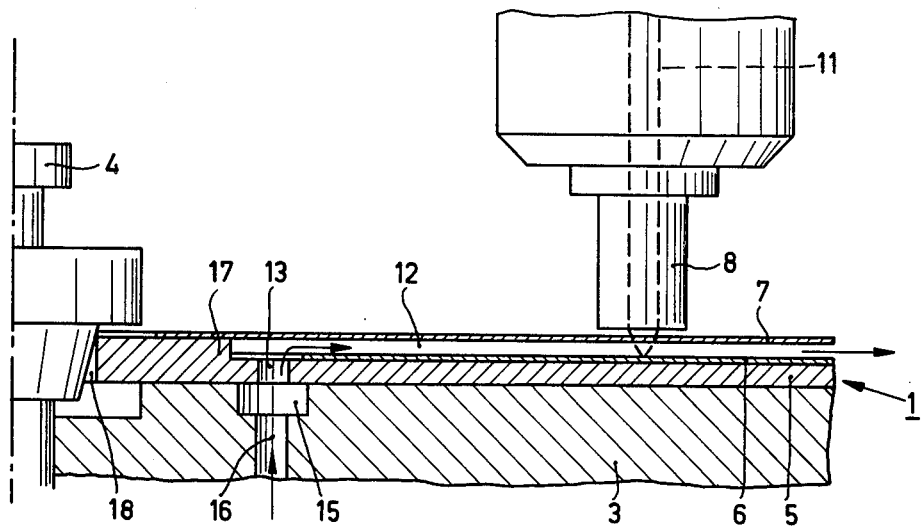
FIG. 2 is a sectional view of part of the machine and the record of FIG. 1.

The method according to the invention for writing information with an information modulated write beam onto an information storage medium can be most easily understood by reference to FIG. 1 and FIG. 2. A video master record 1 is rotated at a predetermined speed by a motor assembly 2 and is positioned on a turntable 3 with the aid of a locking member 4. The term "master record" is herein confined to that of describing the record which is initially exposed to the write beam and which may later be treated to produce a record which can be used to make reproductions.

The master record 1 comprises a base 5 which is a plastic or glass disc and has a radiation sensitive layer 6 consisting of a metal film evaporated onto a face of the disc. A write beam transparent protective means, a plastic foil 7, is provided over the surface of the information layer 6.

An objective 8 is connected to an arm 9 belonging to a frame which is not shown in the drawing. Optical elements, such as a mirror 10 are present for directing a radiation write beam to the optical elements in the objective 8. The beam 11 comes from a suitable laser source, such as an argon laser, and video information is modulated on it in a suitable way. The beam is focussed through the protective foil 7 on the information layer 6 by means of any known optical focus sensing device (not shown) and a voice coil (not shown) connected thereto. The arm 9 is moved radially while the master record 1 is rotated so that a spiralling information track consisting of small pits in the metal of the information layer is written in the manner known from the prior art.

The protective foil 7 is connected to the central portion of the disc 5 by adhesive means, and prior to recording, clings to the recording surface by electrostatic force. During rotation a gas filled space 12 exists between the foil 7 and the information layer 6 in which gas, preferably highly purified, may flow from gas admission openings 13 radially outwards and expelled through an annular gap 14 between the outer edges of the foil 7 and the disc 5. The turntable 3 is provided with an annular groove 15, corresponding to the gas admission openings 13, and gas is fed into the groove via a passage 16 in the turntable 3. These measures provide a number of advantages, especially in the method here described wherein the pits in the metal information layer are formed by evaporation of metal. The vapor will be transported by the gas stream and will not be able to reach the last optical element of the objective 8.

The disc 5 is provided with a central part 17 which is raised a little, for instance 0.25 mm, above the information layer 6, the width of the space 12 is determined by this dimension. The foil 7 may be of any thin, optically homogeneous foil which can have relatively large flatness and thickness tolerances, such as a suitable plastic foil of 0.25 mm, i.e. polyvinyl chloride foil.

In the middle of the raised part 17 a center hole 18 is provided, for cooperation with the locking member 4. The protective foil also has a center opening 19. The foil and the disc are connected adhesively to each other exclusively near these center openings over an area roughly identical to the raised part 17.

Figure 4:
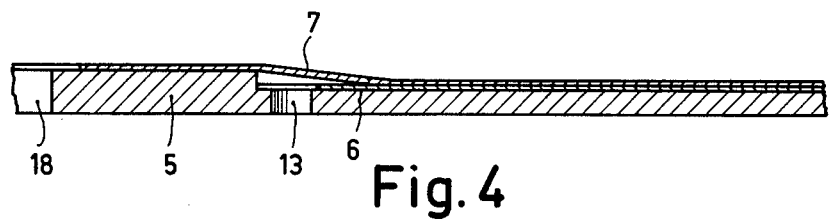
FIG. 4 is a sectional view of part of the master record of FIG. 3 when the record is not rotating and FIG. 5 illustrates an alternative method of fabricating a master record, wherein a rigid protective means is employed which is connected to stationary part of the recording machine.

The foil and the air filled space form a good protection of the information layer against dust, finger prints and scratches. The number of degrees of freedom in manufacture of the disc and the information layer are significantly increased. As illustrated in FIG. 4, electrostatic charges will tend to hold the foil in contact with the information layer when the record is not rotating.

In order to seal the information layer effectively against dust particles, the gas supply to the gas admission openings 13 may be stopped while the turntable 3 still rotates. The vacuum which will be created in the space 12 will pull the foil against the information layer.

Figure 3:
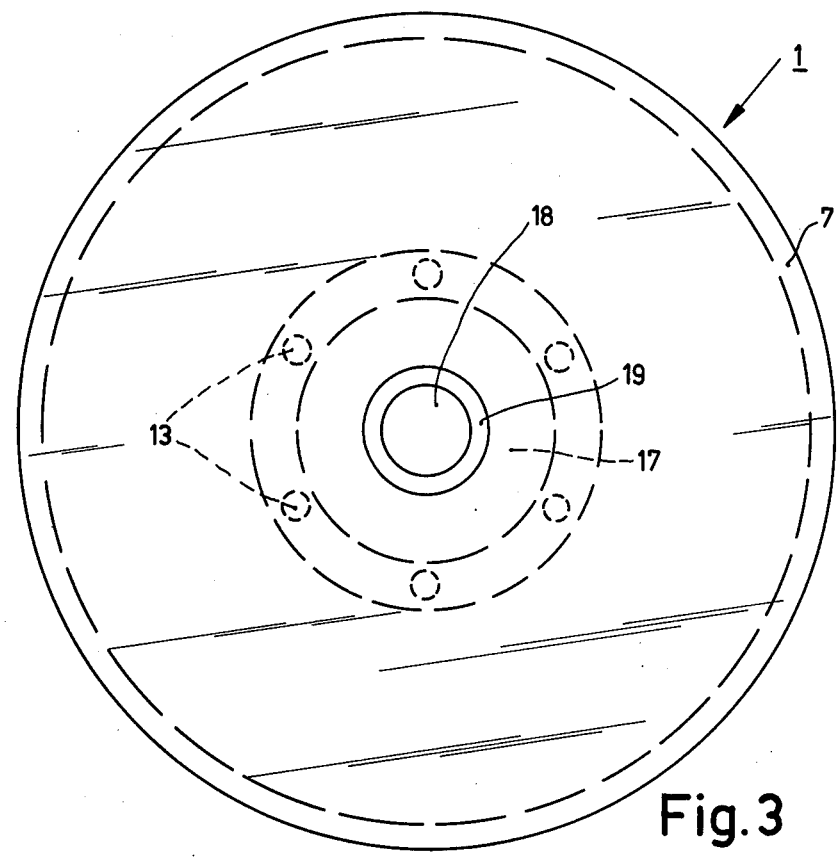
FIG. 3 is a plan view of the master record used with the machine of FIG. 1.

A video record such as shown in FIGS. 3 and 4, not being a master record or a "draw" record but being a mass produced reproduction for the consumer video record market, could have some noticeable advantages over prior art video records which are known from published Netherlands patent application No. 7211999 and which comprise a light transparent base, a metallic light reflecting information layer on one of the faces of the base and a protective layer applied over the information layer, which protective layer may be light absorbing. Read out of the information is effected by focussing a laser read beam through the transparent base onto the information layer and subsequent processing of the reflected, modulated beam, which travels through the base and back into the video record player.

Only a limited number of available materials are suited for the base of this known video record. The base has to be light transparent and opticaly homogeneous, should not include any entrapped air bubbles or dust particles near the beam focussing plane, that is the information layer, and also lend itself well to mass production methods. Furthermore, the record should not be too expensive. Some of the plastics which have been used up till now, such as polyvinyl chloride, have relatively little dimensional stability, especially at temperatures above normal room temperature and may not stand up too well against frequent manual handling.

A video record according to the invention may have a base, the material of which may be chosen from a much greater number of available materials while, if a new material would have to be developed for it the number of degrees of freedom in development and manufacture is increased.

Figure 5:
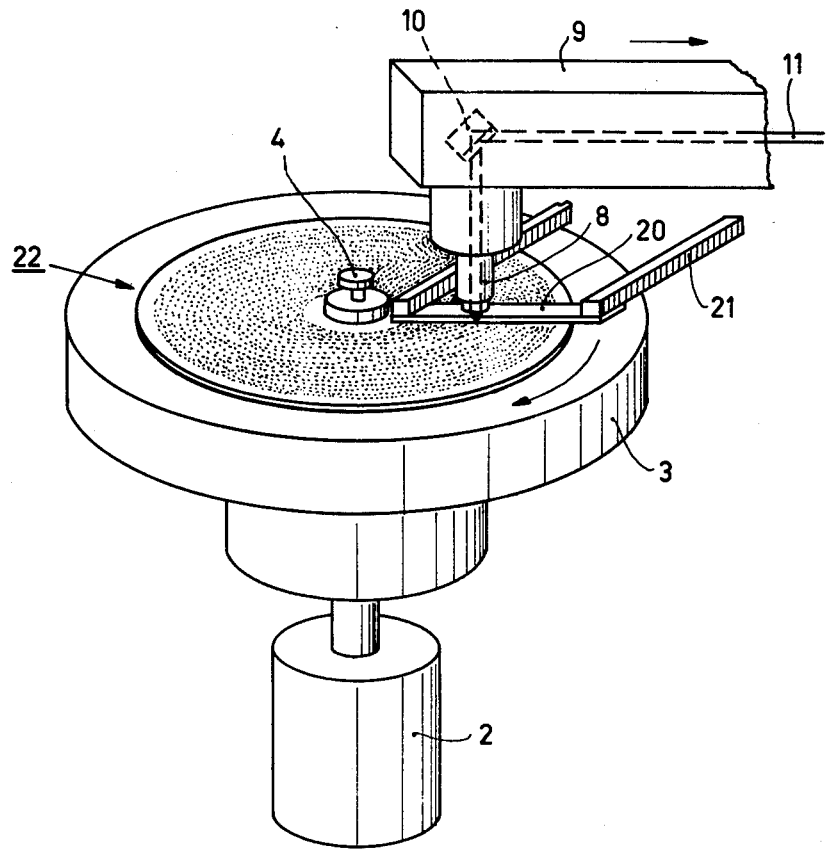

While the invention has been described in conjunction with a specific embodiment thereof, it is evident that many alterations, modifications and variations will be apparent to those skilled in the art in the light of the above disclosure. Accordingly, it is intended to embrace such alterations, modifications and variations which fall within the spirit and scope of this invention as defined by the appended claims. FIG. 5 shows one such modification, in which the protective means is a thin glass strip 20, connected to a stationary frame 21. The objective 8 is thus protected against metal vapor during writing of information on record 22.

What is claimed is:

1. A method for writing information with an information modulated radiation write beam onto a radiation sensitive information layer provided on at least one face of an information storage medium, the information being stored in the information layer by local changes in the physical properties of the information layer, the method comprising the steps of:
 a. providing a write-beam-transparent flexible foil attached to at least part of said information storage medium and in clinging relationship to said information layer prior to recording,
 b. immediately prior to writing said information providing a gas layer between said foil and said information layer, thereby separating said transparent foil from said information layer,
 c. modulating the read beam with the information to be stored in the storage medium,
 d. focussing the modulated write beam through the protective foil and through said gas layer onto said information layer,
 e. moving the write beam in relation to the storage medium and the protective foil in order to write information tracks in said information layer,
 f. maintaining said gas layer between said transparent foil and said information layer throughout said writing process, and
 g. exhausting said gas from between said foil and said information layer subsequent to said writing process to reestablish said clinging relationship between said foil and said information layer, thereby protecting said information layer from dust contamination both prior and subsequent to writing, while providing a gas-filled space abutting said information layer during the writing process to permit by-products of the writing process to pass freely from said information layer.

2. An information storage medium, comprising a base, a radiation-sensitive information layer on a surface of the base, a radiation-transparent protective foil attached to at least part of the storage medium and in separable clinging relationship to said radiation-sensitive information layer, and said storage medium being provided with a gas-admitting aperture communicating with the interface of said protective foil and said information layer and comprising a means for providing a layer of gas between said protective foil and said information layer during a writing process and for permitting said gas layer to be exhausted subsequent to said writing process.

3. An information storage medium as recited in claim 2, wherein parts of said base are raised above said information layer to facilitate the separation between said protective foil and said information layer during writing.

4. An information storage medium as recited in claim 2, wherein a second aperture is provided communicating with said interface and comprising means for exhausting gas admitted between the protective foil and the information layer during writing.

5. An information storage medium as recited in claim 2, wherein said information storage medium is in the shape of a disc having a center hole, the protective foil having a shape substantially identical to that of the disc and also being provided with a center hole, the disc and foil being connected exclusively on the edge of their nearest center hole, the disc being provided with a number of air admission openings situated around the center hole in an area radially outside the area where the disc and foil are connected to each other, whereby during rotation of the disc air passes through the air admission openings and is expelled under the action of centrifugal forces through an annular gap formed between the outer edges of the disc and the foil.

6. An information storage medium as recited in claim 2, wherein said gas admitting aperture further comprises a means for providing a moving layer of gas between said protective foil and said information layer during the writing process.

* * * * *